United States Patent [19]

Berger

[11] 3,821,218

[45] June 28, 1974

[54] NITROGEN-CONTAINING ORGANOSILICON MATERIALS

[75] Inventor: Abe Berger, Schenectady, N.Y.

[73] Assignee: General Electric Company, Waterford, N.Y.

[22] Filed: Dec. 8, 1970

[21] Appl. No.: 96,281

Related U.S. Application Data

[60] Continuation-in-part of Ser. No. 870,718, Aug. 15, 1969, Pat. No. 3,598,852, which is a division of Ser. No. 669,298, Sept. 20, 1967, Pat. No. 3,494,951, said Ser. No. 870,718, is a continuation-in-part of Ser. No. 669,284, Sept. 20, 1967, Pat. No. 3,517,001.

[52] U.S. Cl.... 260/248 NS, 260/824 R, 117/151 ZA
[51] Int. Cl.............................................. C07d 55/38
[58] Field of Search............................. 260/248 NS

[56] References Cited
UNITED STATES PATENTS

| | | | |
|---|---|---|---|
| 3,494,951 | 2/1970 | Berger | 260/248 |
| 3,517,001 | 6/1970 | Berger | 260/248 |

OTHER PUBLICATIONS

Nagasawa et al., Japan Petroleum Inst., Bull., Vol. 6, pp. 72–78 (June 1964).

Fukui et al., Bull, Chem. Soc., Japan, Vol. 38, 1586–1589 (1965).

*Primary Examiner*—John M. Ford
*Attorney, Agent, or Firm*—Donald J. Voss; E. Philip Koltos; Frank L. Neuhauser

[57] ABSTRACT

A method is provided for making various nitrogen-containing organosilicon compounds, such as silylorganoisocyanates, the corresponding carbamate and isocyanurates. The method involves contacting silylorganohalide and a metal cyanate in the presence of a suitable aprotic solvent. Nitrogen-containing organosilicon compounds are provided having silicon and nitrogen atoms separated by a divalent hydrocarbon radical. In instances where a urethane is desired, an appropriate aliphatic monohydric alcohol can be utilized in combination with the silylorganohalide and metal cyanate. The subject nitrogen-containing organosilicon compounds can be utilized for making silicon-organic copolymers and as treating agents for imparting water repellency to various substances.

3 Claims, No Drawings

NITROGEN-CONTAINING ORGANOSILICON MATERIALS

BACKGROUND OF THE INVENTION

This application is a continuation-in-part of the parent application having Ser. No. 870,718 filed Aug. 15, 1969 which issued into U.S. Pat. No. 3,598,852, which is a divisional of the application having a Ser. No. 669,298 filed Sept. 20, 1967 which issued into U.S. Pat. No. 3,494,951, which parent application Ser. No. 870,718 which issued into U.S. Pat. No. 3,598,852 is also a continuation-in-part of patent application Ser. No. 669,284, filed Sept. 20, 1967 which issued into U.S. Pat. No. 3,517,001.

The present invention relates to various methods of making certain nitrogen-containing organosilicon materials, based on contacting a metal cyanate and a silylorganohalide at elevated temperatures. More particularly, the present invention relates to certain silylorganocarbamates and to the employment of these materials to make silylorganoisocyanates.

Prior to the present invention, methods for making certain silylisocyanates involved the direct reaction between a halosilane and a metal cyanate. For example, Klein U.S. Pat. No. 2,532,559 shows the use of lead cyanate with dimethyldichlorosilane to produce dimethyldiisocyanatosilane. Those skilled in the art know that such silylisocyanates are hydrolytically unstable because the isocyanate radical is directly attached to silicon. Speier U.S. Pat. No. 3,170,891 shows a method for making silylorganoisocyanates having the silicon atom and the isocyanate radical separated by a divalent hydrocarbon radical. Reaction is effected between a silicon hydride and an olefinically unsaturated isocyanate, such as allylisocyanate. Experience has shown that although the silylorganoisocyanates made by Speier's method, having a silicon-carbon bond, instead of a silicon-nitrogen bond, have improved hydrolytic stability, the method of Speier is undesirable for a variety of reasons. For example, it has been found that silicon hydride addition of a silane to an olefinically unsaturated isocyanate, where the silicon has reactive radicals, such as alkoxy attached to silicon, often results in undesirable side reactions between the alkoxy radicals and isocyanate radicals. In addition, Speier's method is economically unattractive because of the expense of olefinically unsaturated isocyanates, such as allylisocyanate.

SUMMARY OF THE INVENTION

The present invention is based on the discovery that silylorganoisocyanates of the formula, 1. $(M)_{3-a}G_aSiR''NCO$ can be made by effecting the pyrolysis of the corresponding carbamate as shown by the following equation,

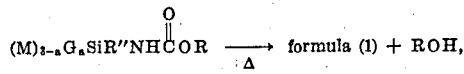

where M is a hydrolyzable radical selected from RO—,

$R_2NO—$, $OCN—$, $SCN—$, $CN—$, $R_2C=NO—$, $R_2N—$,

R—O—O— and

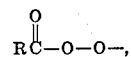

R is a radical selected from alkyl and aryl radicals having from one to eight carbon atoms, G is selected from R' and R'OR''—, where R' is selected from monovalent hydrocarbon radicals and halogenated monovalent hydrocarbon radicals, R'' is selected from divalent hydrocarbon radicals and halogenated divalent hydrocarbon radicals, such as alkylene, arylene, alkylenearylene, alkenylene, alkynylene and alkenylenearylene radicals, and $a$ is a whole number equal to from 0 to 3, inclusive.

There is provided by the present invention, a method for making silylorganoisocyanates of formula (1), which comprises 1. heating a silylorganocarbamate of the formula, (2) 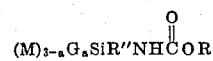

to a temperature which is sufficient to produce a mixture consisting essentially of (A) said silylorganocarbamate, (B) said silylorganoisocyanate of formula (1), and (C) an aliphatic monohydric alcohol, (2) continuous distilling said mixture of (1) to provide for the continuous separation of overhead product consisting essentially of (B) and (C) and (3) recovering (B) from said overhead product of (2), where M, G. R, R', R'' and $a$ are as previously defined.

The present invention also is directed to silylorganocarbamates of the formula (2), which can be made by (1) effecting reaction between a silylorganohalide, a metal cyanate and an aliphatic monohydric alcohol in the presence of an aprotic solvent, as shown by the following equation,

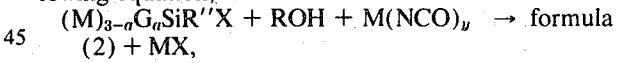

$(M)_{3-a}G_aSiR''X + ROH + M(NCO)_y \rightarrow$ formula (2) + MX, (2) separating metal salts from the resulting mixture of (1) and (3) stripping the aprotic solvent from the resulting mixture of (2), where M, G, R, R', and R'' are as defined above, X is a halogen radical, M is a metal, and $y$ is the valence of the metal.

DETAILED DESCRIPTION OF THE PREFERRED EMBODIMENT

Radicals included by R of the above formulae are, for example, alkyl radicals, such as methyl, ethyl, propyl, butyl, pentyl, hexyl, heptyl and octyl and aryl radicals such as phenyl, etc. Radicals included by R' are, for example, aryl radicals and halogenated aryl radicals, such as phenyl, chlorophenyl, xylyl, naphthyl, etc.; aralkyl radicals such as benzyl, phenylethyl, etc.; alkyl radicals such as methyl, ethyl, propyl, hexyl, etc.; haloalkyl radicals such as chloropropyl, difluoropropyl, bromobutyl, etc.; alkenyl radicals such as vinyl, allyl, 1-propenyl, etc.; cycloaliphatic and haloaliphatic radicals such as cyclobutyl, cyclopentyl, cyclohexyl, etc. Radicals included by R'' are, for example, alkylene radicals and haloalkylene radicals such as methylene, ethylene, trimethylene, butylene, pentylene, halobutylene, etc.; arylenealkylene such as —$C_6H_4CH_2$—, alkenylene such as alkyl; alkynylene such as propargol, etc., and alkenylenearylene such as phenylpropenylene, etc. In the above formulae, where R, R' and R'' can be more than one radical, these radicals can be all the same, or any two or more of the aforementioned radicals.

Another aspect of the invention is directed to a method for making isocyanurates of the formula, (3)
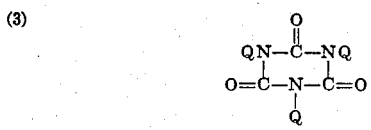

where Q is $(M)_{3-a}G_aSiR''$—, which comprises (1) effecting reaction between $(M)_{3-a}G_aSiR''X$ and $M(NCO)_y$ in the presence of an aprotic solvent (2) removing metal salts from the resulting mixture of (1), and (3) stripping said aprotic solvent from the resulting product of (2).

Included by the silylorganoisocyanates of the formula (1) are, for example, trimethoxysilylpropylisocyanate, phenyldiethoxysilylpropylisocyanate, methyldimethoxysilylbutylisocyanate, ethoxydimethylsilylbutylisocyanate, etc. Some of the silylorganocarbamates of formula (2) are, for example, methyl N-trimethoxysilylpropylcarbamate, ethyl N-methyldimethoxysilylpropylcarbamate, ethyl N-triethoxysilylbutylcarbamate, methyl N-phenylmethylmethoxysilylpropylcarbamate, etc.

Alkylhalosilanes which can be utilized in the practice of the invention are, for example, chloropropyltrimethoxysilane, bromopropyltrimethoxysilane, chlorobutyldimethylethoxysilane, chloropropyltriethoxysilane, chloropropylmethyldimethoxysilane, chlorobutylphenylmethyl n-propoxysilane, iodopropyltrimethoxysilane, etc. Metal cyanates which can be employed in the practice of the invention are, for example, lithium cyanate, sodium cyanate, potassium cyanate, rubidium cyanate, barium cyanate, strontium cyanate, silver cyanate, lead cyanate, mercury cyanate, calcium cyanate, etc.

Some of the isocyanurates which are included by formula (3) are, for example, 1,3,5-tris(trimethoxysilylpropyl)isocyanurate, 1,3,5-tris(methyldimethoxysilylpropyl)-isocyanurate, 1,3,5-tris(dimethylethoxysilylbutyl)isocyanurate, 1,3,5-tris(phenylmethylmethoxysilylpropyl)isocyanurate, etc.

The silylorganoisocyanates of formula (1) can be employed as caulking compounds when exposed to atmospheric moisture. They also can be used to polymerize hydroxylated organic polymers such as polyethers and polyesters. The silylorganocarbamates of formula (2) can be used as glass sizing materials, metal protectants, etc. Among the uses of the isocyanurates of formula (3) are as adhesion promoters for room temperature vulcanizing compositions, as shown in my copending application Ser. No. 669,284, now U.S. Pat. No. 3,517,001 filed concurrently herewith and assigned to the same assignee as the present invention.

In preparing the silylorganocarbamates of formula (2), the silylorganohalide, aliphatic monohydric alcohol and metal cyanate are mixed together in a suitable aprotic solvent. Alcohols which can be employed are, for example, methyl alcohol, ethyl alcohol, n-propyl alcohol, n-butyl alcohol and other alcohols having from one to eight carbon atoms. A suitable aprotic solvent is a solvent for the various ingredients required in the practice of the invention, which have no active protons which may interfere with the formation of desired product. Examples of aprotic solvents which can be employed in the practice of the invention are preferably, for example, dimethylformamide, dimethylacetamide, N-methylpyrolidone, diethylacetamide, and diethylformamide. In addition, solvents such as ethers, nitriles and esters are operative, such as for example, ethyleneglycoldimethylether, diethyleneglycoldimethylether, triethyleneglycoldimethylether, and tetraethyleneglycoldimethylether, benzonitrile, ethyl benzoate, tributylphosphate, etc. The order of addition of the various reactants is not critical. In order to avoid undesirable losses of reactants, as well as provide for optimum yields of desired product, substantially equal molar amounts of the various reactants, for example, silylorganohalide alcohol, metal cyanate, etc., can be employed even though excesses, such as up to 10 molar excesses of any of the reactants, will not adversely affect the formation of desired product. In instances where a metal cyanate of a polyvalent metal is employed, sufficient metal cyanate should be utilized to provide for at least one mole of cyanate, per mole of silylorganohalide.

After the various ingredients have been mixed together, the resulting mixture can be brought to reflux to initiate the reaction. Experience has shown that a temperature in the range of between 90°C to 140°C will generally provide for effective results. Reaction times of from 3 hours to 8 hours will be required depending upon the type and nature of the various reactants employed, and the temperature utilized during the reaction. One indication of carbamate formation is the rise in the reflux temperature as the urethane starts to form. If desired, a vapor phase chromatograph of the reaction mixture can be taken to confirm the disappearance of starting silylorganohalide and the appearance of the silylorganocarbamate.

The conversion of the silylorganocarbamate to the corresponding isocyanate can be readily achieved. The silylorganocarbamate can be cracked by heating it to reflux under reduced pressure to provide for the initial separation of the aliphatic monohydric alcohol. For example, pressure such as 0.25 mm to 500 mm can be employed, while a temperature in the range of 75°C to 200°C has been found effective. The alcohol can be caught in a trap, such as a dry ice trap. With proper adjustment of the reflux ratio, there can be achieved continuous cracking of the silylorganocarbamate, and continuous separation of the silylorganoisocyanate as an overhead product. The cracking temperature of the silylorganocarbamate and the proper reflux ratio can be best determined by initially bringing the silylorganocarbamate to reflux in a suitable fractionating column under reduced pressure, while providing for the continuous separation of the aliphatic monohydric alcohol.

Experience has shown that if the silylorganocarbamate is heated too rapidly, i.e., without proper reflux control to provide for the separation of overhead product and return of silylorganocarbamate, isocyanurate of formula (3) can be formed along with isocyanate of formula (1). To avoid isocyanurate formation, careful control of the reflux of the silylorganocarbamate must be observed.

The preferred method of making the isocyanurate of formula (3) is by heating a mixture of the silylorganohalide and metal cyanate and an aprotic solvent to a temperature between 100°C – 250°C and preferably 130°C – 160°C in the absence of the aliphatic monohydric alcohol. Prior to stripping the isocyanurate of aprotic solvent, removal of metal salts from the mixture has been found expedient.

In order that those skilled in the art may be better able to practice the invention, the following examples are given by way of illustration and not by way of limitation. All parts are by weight.

EXAMPLE 1

A dimethylformamide solution of a mole of chloropropyltrimethoxysilane, 1.2 moles of potassium cyanate and 2 moles of methanol was heated to reflux. The solution consisted of two parts of solvent, per part of the total weight of reactants. The mixture was refluxed for a period of 6 to 8 hours. The temperature of the mixture gradually climbed from 90°C to 120°C. A vapor phase chromatograph of the mixture showed almost the complete absence of the chloropropyltrimethoxysilane. The mixture was refluxed for an additional 2 hours. The mixture was then allowed to cool and it was filtered. The solvent was then flash distilled. The resulting material was then fractionated. There was obtained a 85% yield of a product having a boiling point of 90°C at 1.4 mm Hg. Based on method of preparation and its infrared spectrum, the product was methyl N-trimethoxysilylpropylcarbamate.

Methyl N-trimethoxysilylpropylcarbamate is applied to glass fibers by spraying them with a 2% methanol solution. The treated fibers are then heated in contact with a sheet of silicone rubber under pressure. A glass reinforced rubber composite is produced.

EXAMPLE 2

There was heated to 160°C, 119 parts of methyltrimethoxysilylpropylcarbamate. A vacuum of 1 mm was maintained during the heating. The mixture began to reflux and a first reaction product was continuously recovered overhead at a temperature of 84°C. In addition, a more volatile second product was continuously caught in a dry-ice trap. Reflux and product recovery was continued for an additional five hours. There was obtained 75 parts of the first reaction product. Based on its method of preparation, its infrared spectrum showing isocyanate absorption at 4.58 microns, and the total absence of urethane absorption at 5.78 microns, the first reaction product was trimethoxysilylpropylisocyanate.

EXAMPLE 3

A mixture of 40 parts of chloropropyltrimethoxysilane, 50 parts of anhydrous dimethylformamide and 16.2 parts of potassium cyanate was heated to 130°C at atmospheric pressure. After heating for 4 hours a vapor phase chromatograph showed the complete absence of the original starting material. The reaction mixture was then allowed to cool and it was filtered. It was then stripped of solvent. The resulting product was distilled at 236°C at 0.2 mm Hg. There was obtained 35 parts of product which represented a yield of about 86% based on the starting reactants. Based on its method of preparation and its infrared spectrum, the product was 1,3,5-tris(trimethoxysilylpropyl)isocyanurate.

EXAMPLE 4

A mixture of 36.4 parts of chloropropyldimethoxymethylsilane, 16.2 parts of potassium cyanate and 50 parts of dimethylformamide, was heated in accordance with the procedure of Example 3. After a period of about 5 hours at 140°C, a vapor phase chromatograph of the mixture showed the complete absence of the original starting materials. There was obtained a yield of about 82% of product which was distilled at 221°C at 0.25 mm Hg. Based on its method of preparation and its infrared spectrum, the product was 1,3,5-tris(dimethoxymethylpropyl)isocyanurate.

EXAMPLE 5

A reaction mixture consisting of 36.4 parts of chloropropylmethyldimethoxysilane, 17 parts of potassium cyanate, 6.4 parts of anhydrous propanol and 75 parts of dry dimethylformamide is allowed to reflux at atmospheric pressure under a dry atmosphere. The reflux temperature rises from 90°C to 125°C for a period of about 6 hours. A vapor phase chromatograph shows complete absence of starting material and appearance of a new peak. A product is recovered following the procedure of Example 1. It is propyl N-dimethoxysilylpropylcarbamate, based on its method of preparation and its infrared spectrum.

Propyl N-dimethoxysilylpropylcarbamate is then heated under reduced pressure and fractionated. Propanol is collected in a dry-ice trap. A second product distills overhead. Based on its method of preparation and its infrared spectrum showing a strong absorption band at 4.58 microns, the product is methyldimethoxysilylpropylisocyanate.

EXAMPLE 6

A carbamate reaction mixture of 29.2 parts of p-phenyldimethoxysilylchloromethylbenzene, 11.1 parts of barium cyanate, 5 parts of methanol and 75 parts of N-methylpyrolidone is heated to reflux. The p-phenyldimethoxysilylchloromethylbenzene is prepared by initially reacting one mole of p-tolylmagnesium chloride with two moles of phenyltrichlorosilane in tetrahydrofuran at a temperature between 40°C – 60°C. The resulting phenyl, p-tolyl-substituted dichlorosilane is thereafter chlorinated in the presence of ultraviolet light and alkoxylated with methanol in the presence of pyridine.

The course of the above-described carbamate reaction is followed with a vapor phase chromatograph. At the completion of the reaction, the mixture is allowed to cool and filtered of salts. The solvent removed by flash distillation. Based on method of preparation, there is obtained methyl-N-4-dimethoxyphenylsilylbenzyl carbamate.

While the foregoing examples have of necessity been limited to only a few of the very many variables within the scope of the present invention, it should be understood that the present invention covers a much broader class of silylorganocarbamates as shown by formula (2), and methods for making the corresponding isocyanates of formula (1), and isocyanurates of formula (3).

EXAMPLE 7

A mixture of 40 parts of chloropropyltriacetoxysilane, 70 parts of anhydrous dimethylformamide and 16.2 parts of potassium cyanate is heated to 130°C at atmospheric pressure. After heating for 4 hours a vapor phase chromatograph shows the complete absence of the original starting material. The reaction mixture is then allowed to cool and it is filtered. It is then stripped of solvent and the residue left behind was the desired product. There is obtained 70 parts of product which represents a yield of about 95% based on the starting reactants. Based on its method of preparation and its infrared spectrum, the product is 1,3,5-tris(triacetoxysilylpropyl)isocyanurate.

EXAMPLE 8

A mixture of 40 parts of chloropropyl-tris(N,N-diethylaminoxy)silane, 50 parts of anhydrous dimethylformamide and 16.2 parts of potassium cyanate which represents excess cyanate in the reaction mixture is heated to 130°C at atmospheric pressure. After heating for 5 hours a vapor phase chromatograph shows the complete absence of the original starting material. The reaction mixture is then allowed to cool and it is filtered. It was then stripped of solvent. There is obtained some product whose infrared spectrum is consistent with the structure of 1,3,5-tris(N,N-diethylaminoxysilylpropyl)isocyanurate.

EXAMPLE 9

A mixture of 40 parts of chloropropyltrisisocyanatosilane, 60 parts of anhydrous dimethylformamide and 20 parts of potassium cyanate which is used in excess is heated to 180°C at atmospheric pressure. After heating for 6 hours a vapor phase chromatograph shows the complete absence of the original starting material. The reaction mixture is then allowed to cool and it is filtered. It is then stripped of solvent. There is obtained 25 parts of product which, based on its method of preparation and its infrared spectrum, is 1,3,5-tris(-triisocyanatosilylpropyl)isocyanurate.

EXAMPLE 10

A mixture of 55 parts of chloropropyltris(methylethylketoximino)silane, 80 parts of anhydrous dimethylformamide and 5.0 parts of potassium cyanate which is used in excess is heated to 130°C at atmospheric pressure. After heating for 4 hours a vapor phase chromatograph shows the complete absence of the original starting material. The reaction mixture is then allowed to cool and it is filtered. It is then stripped of solvent. There is obtained 35 parts of product which, based on its method of preparation and its infrared spectrum, is 1,3,5-tris(trimethylethylketoximino) silylpropylisocyanurate.

EXAMPLE 11

A mixture of 45 parts of chloropropyltris-(dimethylamino)silane, 70 parts of anhydrous dimethylformamide and 20 parts of potassium cyanate which is used in excess is heated to 140°C at atmospheric pressure. After heating for 3 hours a vapor phase chromatograph shows the complete absence of the original starting material. The reaction mixture is then allowed to cool and it is filtered. It is then stripped of solvent. There is obtained 20 parts of product which, based on its method of preparation and its infrared spectrum, is 1,3,5-tris-tri(dimethylamino)silylpropylisocyanurate.

EXAMPLE 12

A mixture of 70 parts of chloropropyltris(N-ethylacetimidato)silane, 80 parts of anhydrous dimethylformamide and 35 parts of potassium cyanate which is used in excess is heated to 150°C at atmospheric pressure. After heating for 6 hours a vapor phase chromatograph shows the complete absence of the original starting material. The reaction mixture is then allowed to cool and it is filtered. It is then stripped of solvent. There is obtained 40 parts of product which, based on its method of preparation and its infrared spectrum, is 1,3,5-tris-tri(N-ethylacetimidato) silylpropylisocyanurate.

EXAMPLE 13

A mixture of 50 parts of chloropropyltritertiarybutylhydroperoxysilane, 70 parts of anhydrous dimethylformamide and 25 parts of potassium cyanate was heated to 110°C at atmospheric pressure. After heating for 8 hours a vapor phase chromatograph shows the complete absence of the original starting material. The reaction mixture is then allowed to cool and it is filtered. It is then stripped of solvent. There is obtained 40 parts of product which, based on its method of preparation and its infrared spectrum is 1,3,5-tristritertiarybutylhydroperoxysilylpropylisocyanurate.

What is claimed is:

1. A compound of the formula,

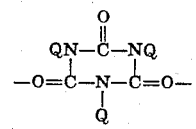

where Q is $M_{3-a}G_aSiR''-$, where M is a hydrolyzable radical selected from RO—,

$R_2NO-$, $OCN-$, $SCN-$, $CN-$, $R_2C=NO-$, $R_2N-$,

R—O—O— and

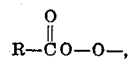

where R is selected from alkyl radicals of one to eight carbon atoms and phenyl radicals, G is selected from R' and R'OR", where R' is an alkyl radical of one to eight carbon atoms, R" is selected from alkylene radicals of one to eight carbon atoms and phenylene and $a$ is a whole number equal to from 0 to 3, inclusive.

2. A compound of claim 1 being 1,3,5-tris(trimethoxysilylpropyl)isocyanurate.

3. A compound of claim 1 being 1,3,5-tris(3'-trimethoxysilylalkylene)isocyanurate where the alkylene radical may have from one to eight carbon atoms.

* * * * *